No. 754,223. PATENTED MAR. 8, 1904.
W. J. LAUGHLIN.
OPTOMETER.
APPLICATION FILED MAY 26, 1903.
NO MODEL. 5 SHEETS—SHEET 1.

WITNESSES: INVENTOR
William J. Laughlin
BY
ATTORNEYS.

No. 754,223. PATENTED MAR. 8, 1904.
W. J. LAUGHLIN.
OPTOMETER.
APPLICATION FILED MAY 26, 1903.
NO MODEL. 5 SHEETS—SHEET 2.

WITNESSES:
INVENTOR
William J. Laughlin
ATTORNEYS.

No. 754,223. PATENTED MAR. 8, 1904.
W. J. LAUGHLIN.
OPTOMETER.
APPLICATION FILED MAY 26, 1903.
NO MODEL. 5 SHEETS—SHEET 3.
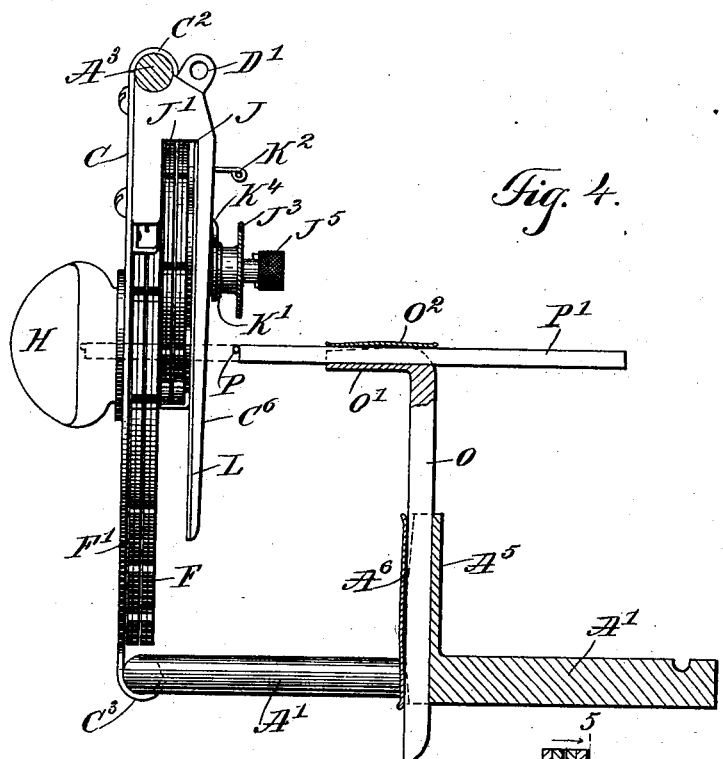
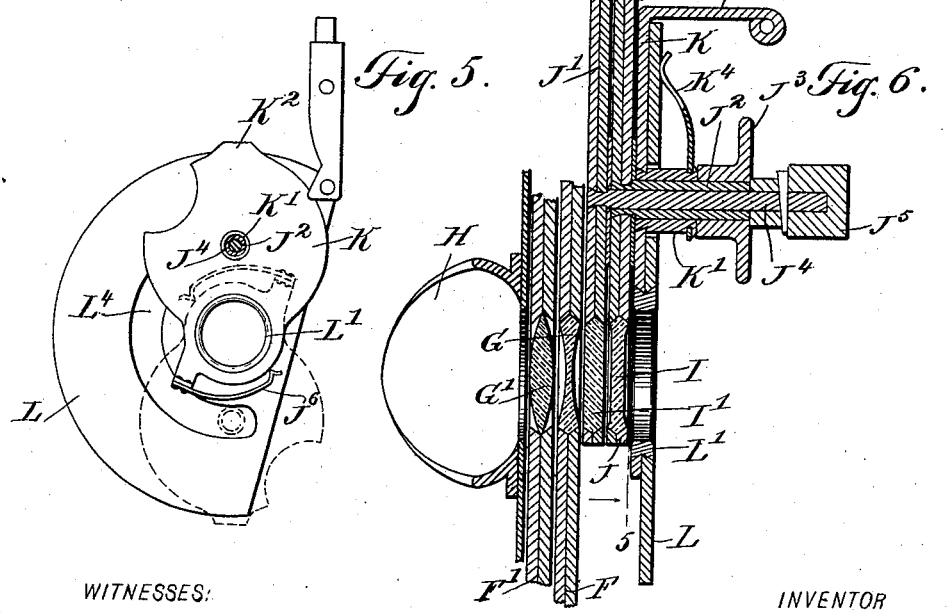
WITNESSES:
INVENTOR
William J. Laughlin
BY
ATTORNEYS.

No. 754,223. PATENTED MAR. 8, 1904.
W. J. LAUGHLIN.
OPTOMETER.
APPLICATION FILED MAY 26, 1903.
NO MODEL. 5 SHEETS—SHEET 4.
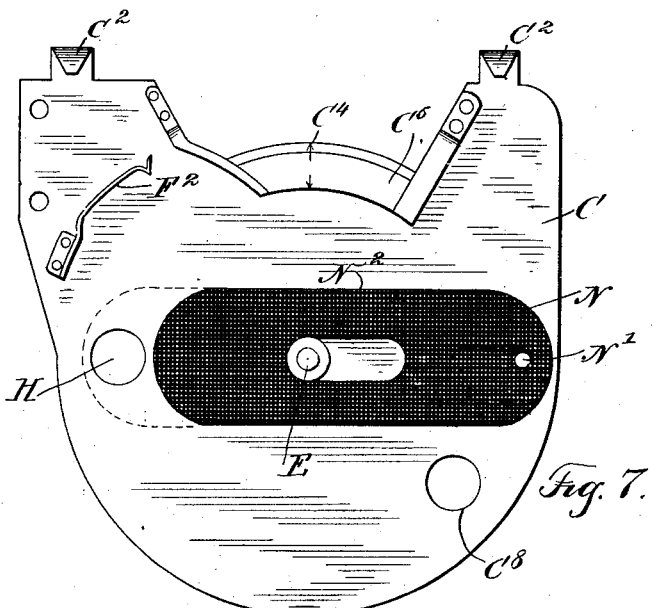
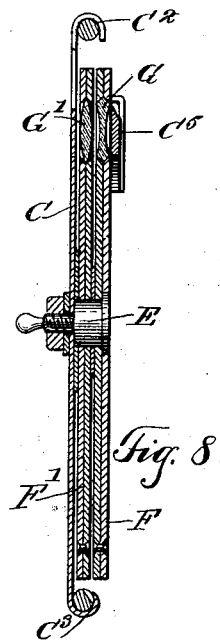
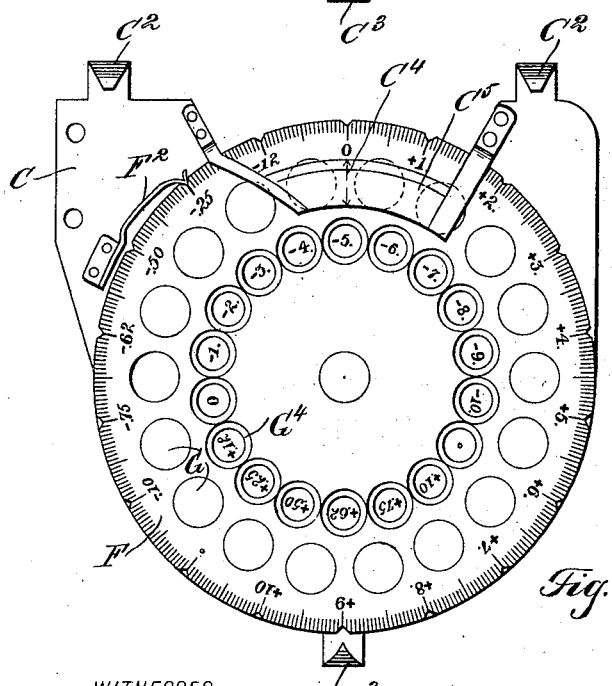
WITNESSES:
INVENTOR
William J. Laughlin
BY
ATTORNEYS.

No. 754,223. PATENTED MAR. 8, 1904.
W. J. LAUGHLIN.
OPTOMETER.
APPLICATION FILED MAY 26, 1903.
NO MODEL. 5 SHEETS—SHEET 5.

WITNESSES:

INVENTOR
William J. Laughlin
BY
ATTORNEYS.

No. 754,223. Patented March 8, 1904.

UNITED STATES PATENT OFFICE.

WILLIAM J. LAUGHLIN, OF WAUNAKEE, WISCONSIN.

OPTOMETER.

SPECIFICATION forming part of Letters Patent No. 754,223, dated March 8, 1904.

Application filed May 26, 1903. Serial No. 158,834. (No model.)

*To all whom it may concern:*

Be it known that I, WILLIAM J. LAUGHLIN, a citizen of the United States, and a resident of Waunakee, in the county of Dane and State of Wisconsin, have invented a new and Improved Optometer, of which the following is a full, clear, and exact description.

The invention relates to optics; and its object is to provide a new and improved optometer, arranged to enable the optician to readily adjust the lenses to any desired power, for conveniently and quickly determining the visional powers and the pupilary distance of the eyes of the patient, for the selection of proper eyeglasses, and for obtaining the height and inclination of the bridge.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1:
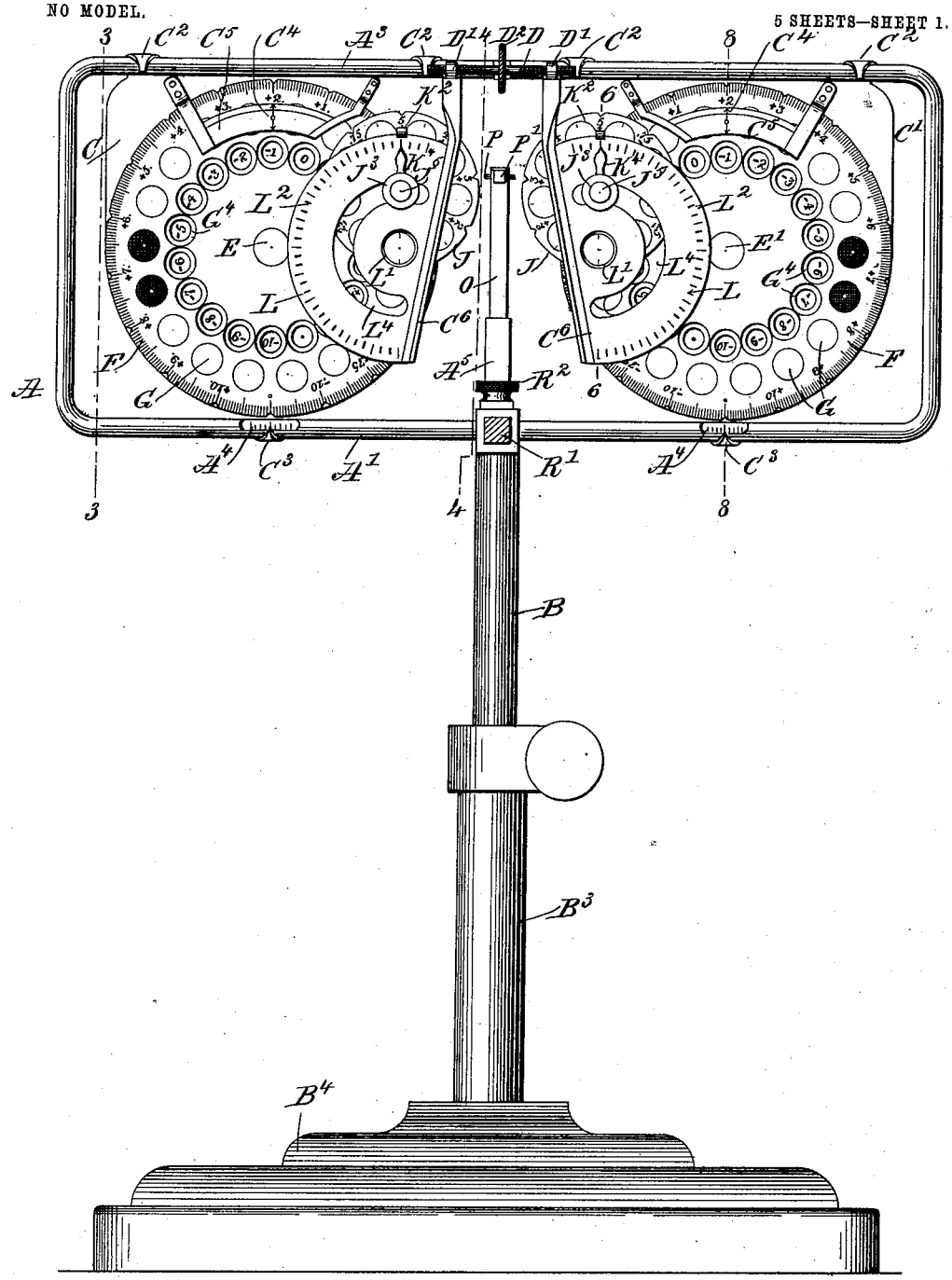
Figure 2:
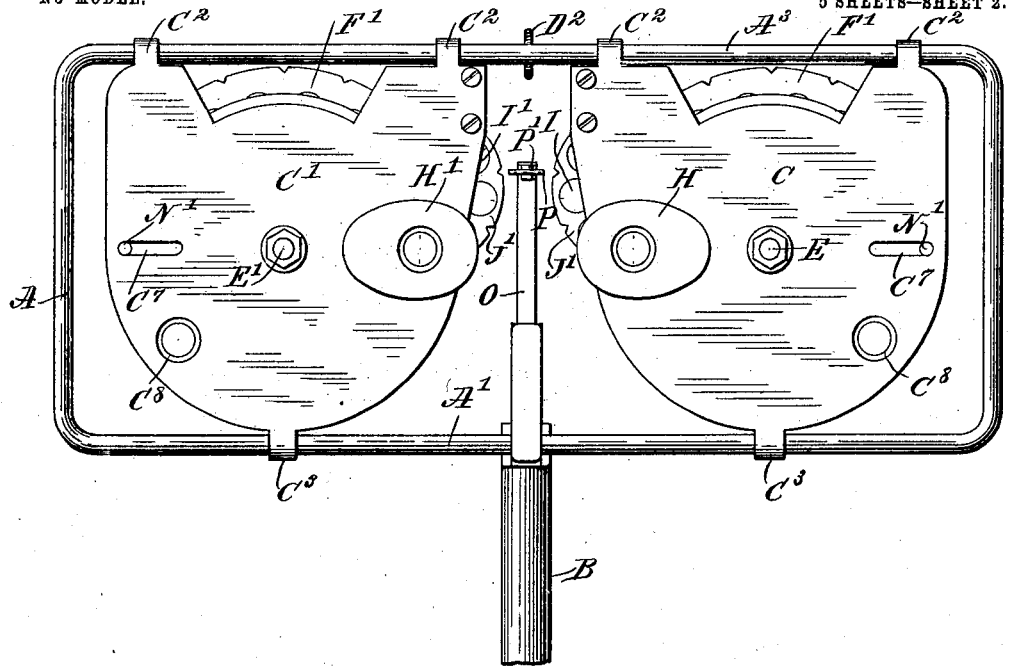
Figure 3:
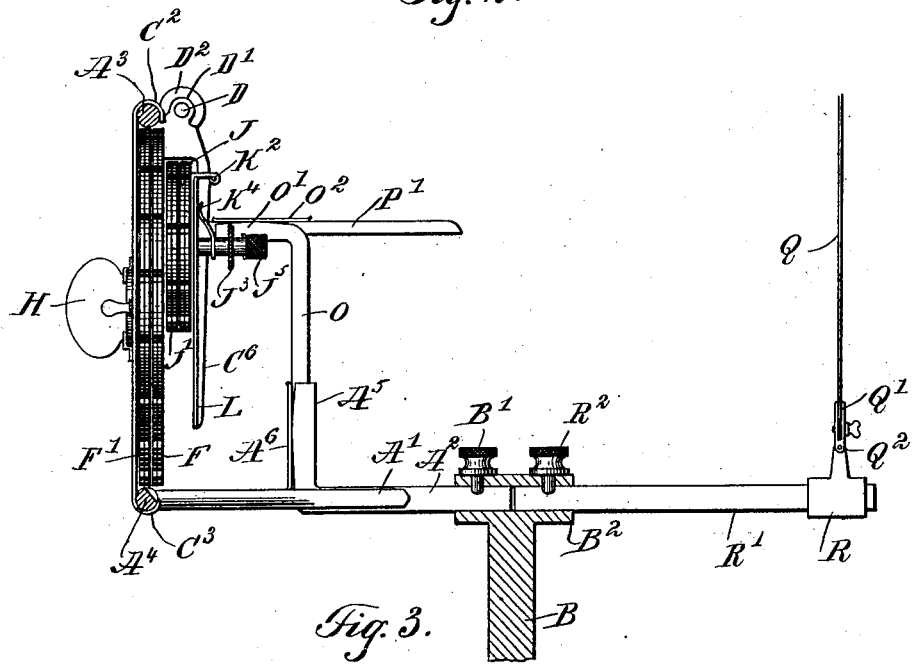
Figure 11:
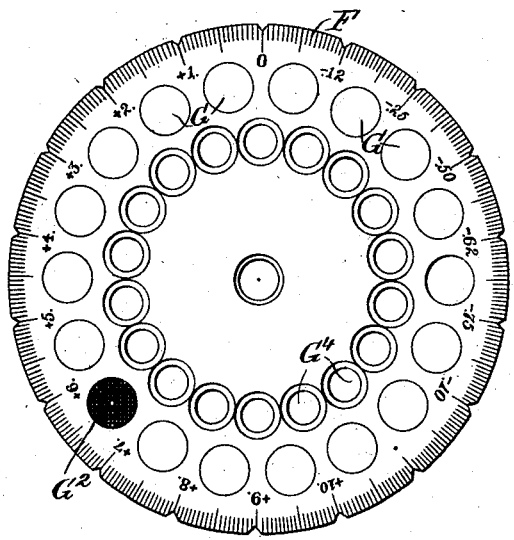
Figure 12:
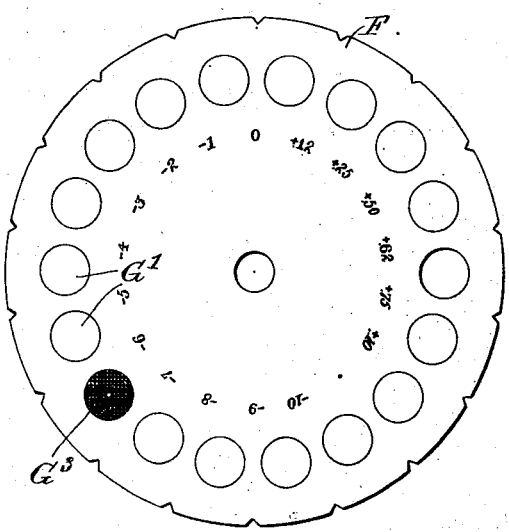
Figure 13:
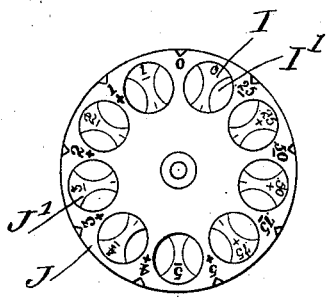
Figure 14:
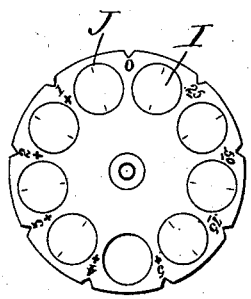
Figure 15:
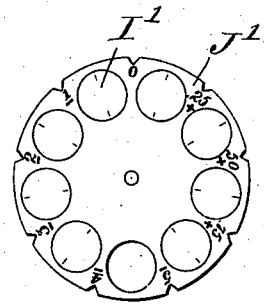
Figure 16:
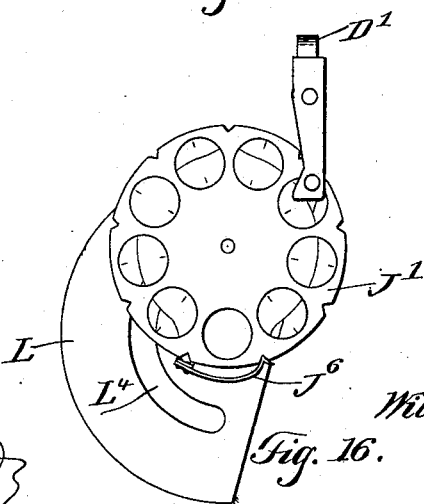

Figure 1 is a rear elevation of the improvement. Fig. 2 is a front elevation of the same. Fig. 3 is a transverse section of the same on the line 3 3 of Fig. 1. Fig. 4 is an enlarged transverse section of the same on the line 4 4 of Fig. 1. Fig. 5 is a sectional front elevation of the swing-arm and the graduated segment for the same. Fig. 6 is an enlarged transverse section of the improvement on the line 6 6 of Fig. 1. Fig. 7 is an enlarged rear face view of one of the supports and the slide mounted thereon. Fig. 8 is a sectional view of one of the supports and the pair of disks carrying the spherical power-lenses, the section being on the line 8 8 of Fig. 1. Fig. 9 is a rear face view of the same. Fig. 10 is an edge view of the same. Figs. 11 and 12 are face views of the disks carrying the spherical power-lenses. Fig. 13 is a face view of the pair of disks carrying the cylindrical power-lenses. Figs. 14 and 15 are face views of the disks carrying the cylindrical power-lenses, and Fig. 16 is a front elevation of the pair of disks carrying the cylindrical lenses and the graduated segments.

The main frame A of the instrument is preferably of a rectangular skeleton shape and is provided at its bottom member A' with a transversely-extending arm $A^2$, secured by a set-screw B' or like fastening device in a socket $B^2$, held on the upper end of a rod B, vertically adjustable by any suitable means in a standard $B^3$, attached to a base $B^4$, for resting the apparatus on a table, or the said standard $B^3$ may be provided with a clamp for holding the apparatus on a table or the like.

The bottom member A' and the top member $A^3$ of the main frame A form guideways for guide-lugs $C^2$ and $C^3$, forming integral parts of supports C and C', adapted to slide toward and from each other by the operator turning a right and left hand threaded screw-rod D, engaging corresponding nuts D', attached to the supports C and C'. The screw-rod D is provided at its middle with a head $D^2$, adapted to be turned by the operator to move the supports C and C' simultaneously toward and from each other. The lowermost guide-lugs $C^3$ on the frame member A' form pointers indicating on linear graduations $A^4$, arranged on the said member A' to indicate the pupilary distance between the eyes of the patient (see Fig. 1) by the operator turning the screw-rod D correspondingly.

On the supports C and C' are held centrally studs E and E', on each of which is mounted a pair of disks F and F', containing spherical power-lenses G and G', arranged in a circle, so that any lens in one of the disks can be brought in register with any lens in the other disk, and the registering lenses to be used at a time are in alinement with an eyepiece H or H' on the front face of the corresponding support C or C'. The lenses G in the disk F are plus unit power-lenses, from +1D to +10D, and minus fractional power-lenses, from −.12D to −.75D, and a −10D lens. The other disk, F', contains minus unit power-lenses, from −1D to −10D, and plus fractional power-lenses, from +.12D to +.75D, and also a +10D lens. Each of the disks F and F' is also provided with a blank-opening and a pinhole disk $G^2$ or $G^3$, as plainly indicated in Figs. 11 and 12. The value of the lenses is marked on the disks F and F', and the value of the lenses on the disk F' can be read through openings G⁴ in the disk F, it being understood, however, that the said values are read on a zero-mark C⁴, formed on a cross-bar C⁵, held on the corresponding support C or C'— that is, the value read at the said zero-point C⁴ indicates the registering lenses in alinement at the time with the corresponding eyepiece H or H'. The lenses G and G', registering at the time at the corresponding eyepiece H or H', can be used in connection with a pair of registering lenses I and I', arranged in circles in disks J and J', of which the lenses I are arranged in a circle on the disk J and the lenses I' are arranged in a corresponding circle on the disk J', the disks J and J' being located one in front of the other and in the rear of the disk F, as plainly indicated in the drawings. The lenses J and J' give the cylindrical powers from .25D to 5.75D, both plus and minus, as will be readily understood by reference to Figs. 13, 14, and 15.

The disk J (see Fig. 6) is provided with a hub J², mounted to turn in a bearing K', held on an arm K, mounted to swing from an apertured pivot L', secured on a segment L, attached to an arm C⁶, forming part of the corresponding support C or C'. On the end of the hub J² is secured a knob J³, under the control of the operator, for turning the disk J to bring the desired lens I into alinement with the corresponding eyepiece H or H'. The other disk, J', is provided with a shaft J⁴, mounted to turn in the hub J² and provided at its outer end with a knob J⁵ for turning the disk J' to bring a lens I' in register with the lens I in alinement at the time with the eyepiece and the opening in the pivot L'. Now by the operator turning the disks F F' and J J' any desired combination of lenses may be brought into register at the corresponding eyepiece H or H'. In order to hold the disks F and F' against accidental turning after they are set to a desired lens-power, springs F² are provided, (see Fig. 9,) attached to the corresponding support C or C' and in engagement at their free ends with notches on the peripheral faces of the disks F and F'. Similar springs J⁶ (see Fig. 16) are attached to the arms K to engage notches in the peripheral surfaces of the disks J and J' to hold the latter against accidental turning. Each of the arms K is provided with a handle K² to allow the operator to swing the arm, and with it the pair of lenses J and J', on the pivot L' as the fulcrum, so as to change the axis of the corresponding lenses at the time in register with the aperture in the pivot L' and the eyepiece H or H'.

On the bearing K' is secured a pointer K⁴, indicating on a graduation L², formed on the segment L to indicate degrees from zero at the middle of the graduation to ninety degrees at the ends thereof, it being understood that the axes of the lenses I and I' radiate from the axes of the disks, and by swinging the arm K on the segment L any desired degree of axis may be obtained.

By reference to the drawings it will be seen that the bearing K' of the arm K extends through a segmental slot L⁴ in the segment L and the pointer K⁴ is in alinement with the arm K², and the latter serves as the index-finger for setting the disks J and J', according to the value of the lenses marked on the said disks for giving the power of the lenses I and I'.

Each of the supports C and C' is provided with a shutter N, having a handle N', adapted to be moved by the operator, so as to open or close the eyepiece H or H' in the corresponding support C or C'. The handle N' extends through an elongated slot C⁷ in the support C or C', (see Fig. 2,) and the shutter N is provided with an elongated slot N², through which passes a stud E or E' to properly guide the shutter when moved into an open or closed position relative to the eyepiece H or H'.

In order to allow of properly cleaning the lenses G in the disks F', each of the supports C and C' is provided with an aperture C⁸ in register with the said lenses, and in order to allow of cleaning the lenses I and I' in the disks J and J' it is necessary to swing the arms K into a lowermost position to project portions of the disks J and J' beyond the peripheral faces of the disks F to give access to the lenses I and I'.

On the arm A' of the main frame A is formed a vertically-disposed bearing A⁵, in which is mounted to slide vertically a post O, carrying at its upper end a horizontally-disposed bearing O', in which is fitted the bar P' of a nose-piece P for engaging the nose of the patient to enable the optician to obtain proper measurement of the height and inclination of the bridge of the spectacles to be made for the patient. For the purpose mentioned the post O is provided with a graduation, and a similar graduation is on the bar P', and the post O can be moved up and down in its bearing A⁵ by the operator, and the post is held in the adjusted position by a spring A⁶, forming one side of the bearing A⁵ and pressing against the corresponding side of the post O. The bar P' of the nose-piece P is moved inward and outward by the operator, and the bar is held against accidental movement after it is adjusted by a spring O², forming one side of the bearing O' and pressing the corresponding side of the bar P'. (See Fig. 3.)

A reading-card Q is removably held in a clamp Q', fulcrumed at Q² on a slide R, mounted to slide on a bar R', secured by a set-screw R² in the socket B² at the upper end of the rod B, previously referred to. Now by the arrangement described the reading-card Q can be swung up in a vertical position when it is desired to test the patient's eyes as to reading, and the said card can be swung down into a horizontal position to be out of the sight of the patient at the time the instrument is used for testing the eyes as to distance.

In using the device the optician first turns the screw-rod D to adjust the supports C and C' nearer to or farther from each other, according to the pupilary distance of the eyes of the patient, to bring the eyepieces H and H' in proper position for the patient's eyes. The disks F and F' in each pair of disks on a support are now turned by the operator, using the fingers on the roughened outer surfaces of the disks to bring a desired pair of lenses into axial alinement with the corresponding eyepiece, or, if necessary, one disk with the blank-opening therein is brought into axial alinement with the eyepiece and the other disk turned to bring a desired lens in register with the blank-opening and eyepiece, or a pin-hole blank may be moved in position. The operator next turns the disks J and J' correspondingly to bring the desired lens or combination of two lenses I and I' into axial alinement with the corresponding eyepiece and the registering lenses already in position. It is understood that an adjustment of the disks as described is made on each support to determine the visional powers of the eyes of the patient. One eye can be examined independently of the other, and in this case use is made of the shutters N for closing one eyepiece while the other is left open. Now by the arrangement described the optician is enabled to set the instrument for obtaining in a very convenient manner all spherical powers from .12 D to 20 D, both plus and minus, and all cylindrical powers from .25 D to 5.75 D, both plus and minus. By reference to Figs. 11, 12, 14, and 15 it will be seen that like unit and fractional powers are found on the disks of a pair of disks, so that by combining unit and fractional powers at the eyepiece any desired power from 1 D to 10 D can be obtained. The 10 D lens with the fractional powers is intended to be combined with like unit power-lenses on the opposite disk to produce unit powers from 11 D to 20 D both plus and minus. By having the axis of each cylindrical power-lens I or I' set toward the center of the corresponding disk J or J' it is evident that by swinging the arm K on the pivot L' the axis is changed relative to the line of vision. I do not, however, limit myself to the powers of the lenses indicated and described, as the same may be varied without deviating from the invention. For instance, plus unit and fractional powers may be placed on the same disks or wheels and plus, minus, and fractional powers on corresponding disks or wheels to obtain mixed numbers by subtraction, as +1.25, −3.75, &c., instead of by addition.

Having thus described my invention, I claim as new and desire to secure by Letters Patent—

1. An optometer comprising a frame, supports movable toward and from each other on the said frame, and a pair of disks on each support, mounted to turn independent one of the other, one of the disks having plus unit power-lenses, minus fraction power-lenses and a minus 10 D lens, and the other disk having minus unit power-lenses, plus fractional power-lenses and a plus 10 D lens, as set forth.

2. An optometer provided with supports, a pair of disks mounted to turn independent one of the other on the same axis, on each of the said supports, spherical power-lenses in each disk, arranged in a circle, the lenses in one disk being adapted to register with the lenses in the other disk, a second pair of disks, arms mounted to swing on the said supports, eccentric to the first-named disks, the said second pair of disks being mounted to turn on the same axis, but independent one of the other, on the said arms, and cylindrical power-lenses set in a circle in the said second pair of disks and adapted to register with each other and with the spherical power-lenses, as set forth.

3. An optometer provided with supports, a pair of disks mounted to turn independent one of the other on the same axis, on each of the said supports, spherical power-lenses in each disk, arranged in a circle, the lenses in one disk being adapted to register with the lenses in the other disk, a second pair of disks, arms mounted to swing on the said supports, eccentric to the first-named disks, the said second pair of disks being mounted to turn on the same axis, but independent one of the other, on the said arms, cylindrical power-lenses set in a circle in the said second pair of disks and adapted to register with each other and with the spherical power-lenses, and eyepieces on the said supports, in alinement with the registering lenses, as set forth.

4. An optometer provided with supports, a pair of disks mounted to turn independent one of the other on the same axis, on each of the said supports, spherical power-lenses in each disk, arranged in a circle, the lenses in one disk being adapted to register with the lenses in the other disk, a second pair of disks, arms mounted to swing on the said supports, eccentric to the first-named disks, the said second pair of disks being mounted to turn on the same axis, but independent one of the other, on the said arms, cylindrical power-lenses set in a circle in the said second pair of disks and adapted to register with each other and with the spherical power-lenses, and graduated segments fixed on the supports and having hollow pivots for the arms to swing on, the latter indicating on the said segments, as set forth.

5. An optometer provided with supports, a pair of disks mounted to turn independent one of the other on the same axis, on each of the said supports, spherical power-lenses in each disk, arranged in a circle, the lenses in one disk being adapted to register with the lenses in the other disk, a second pair of disks, arms mounted to swing on the said supports, eccentric to the first-named disks, the said second pair of disks being mounted to turn on the same axis, but independent one of the other, on the said arms, and cylindrical power-lenses set in a circle in the said second pair of disks and adapted to register with each other and with the spherical power-lenses, the axes of the said arms corresponding with the axes of the said registering lenses, as set forth.

6. An optometer provided with supports, a pair of disks mounted to turn independent one of the other on the same axis, on each of the said supports, spherical power-lenses in each disk, arranged in a circle, the lenses in one disk being adapted to register with the lenses in the other disk, a second pair of disks, arms mounted to swing on the said supports, eccentric to the first-named disks, the said second pair of disks being mounted to turn on the same axis, but independent one of the other, on the said arms, cylindrical power-lenses set in a circle in the said second pair of disks and adapted to register with each other and with the spherical power-lenses, graduated segments fixed on the supports and having hollow pivots for the arms to swing on, the latter indicating on the said segments, and pointers on the said arms, indicating on the graduation of the said segments, as set forth.

7. An optometer having a pair of disks, one in front of the other, mounted to turn independent one of the other on the same axis, and spherical power-lenses arranged in coinciding circles in the disks, the lenses in one of the disks being plus unit power-lenses, minus fraction power-lenses and a minus D lens, and the lenses in the other disk being minus unit power-lenses, plus fraction power-lenses and a plus D lens, as set forth.

8. An optometer having a pair of independently-revolving disks, carrying registering spherical power-lenses, an arm mounted to swing and having its axis in alinement with the axis of a pair of registering lenses in the said disks, and a second pair of disks, mounted to turn independent one of the other on the said arm and having registering cylindrical power-lenses adapted to register with the said pair of registering spherical power-lenses, as set forth.

9. An optometer having a pair of independently-revolving disks, carrying registering spherical power-lenses, an arm mounted to swing and having its axis in alinement with the axis of a pair of registering lenses in the said disks, a second pair of disks, mounted to turn independent one of the other on the said arm and having registering cylindrical power-lenses adapted to register with the said pair of registering spherical power-lenses, and a fixed graduated segment, on which the said arm indicates, as set forth.

10. In an optometer, a supporting-standard, a rod adjustable vertically in said standard, a frame provided with a transversely-extending arm secured to the upper end of said rod, lens-supports movable toward and from each other on the said frame, a vertically-disposed bearing on the said arm of the frame, a graduated post mounted to slide in said bearing, and a nose-piece mounted to slide in a horizontally-disposed bearing at the upper end of said post and extending between the said lens-supports, as set forth.

11. A frame, lens-supports slidable on the said frame, toward and from each other, a graduated post slidable in the said frame, a nose-piece slidable transversely on the said post, between the said supports, and springs for holding the post and the nose-piece in position in their bearings, as set forth.

12. A frame, lens-supports slidable on the said frame toward and from each other, a graduated post slidable vertically in a bearing on the said frame, a nose-piece slidable transversely in a bearing on the said post, and springs forming one side of said bearings and pressing against the corresponding sides of the post and nose-piece, as set forth.

13. An optometer comprising a frame, supports on the said frame, eyepieces held on the said supports, a pair of disks mounted to turn on each support, the disks of each pair being adapted to be turned independent one of the other, spherical power-lenses set in a circle in the said disks, the lenses of one disk in a pair registering with the lenses in the other disk, a graduated segment on each support, carrying a hollow pivot, in axial alinement with the corresponding eyepiece, a pair of registering lenses on the said disks, an arm mounted to swing on the said pivot and indicating on the graduated segment, a second pair of disks mounted to turn independent one of the other on the said arm, and cylindrical power-lenses set in a circle on the said second pair of disks, one pair of registering cylindrical power-lenses being at the time in axial alinement with the corresponding eyepiece and the said pivot, as set forth.

14. An optometer comprising a frame, supports on the said frame, eyepieces held on the said supports, a pair of disks mounted to turn on each support, the disks of each pair being adapted to be turned independent one of the other, spherical power-lenses set in a circle in the said disks, the lenses of one disk in a pair registering with the lenses in the other disk, a graduated segment on each support, carrying a hollow pivot, in axial alinement with the corresponding eyepiece, a pair of registering lenses on the said disks, an arm mounted to swing on the said pivot and indicating on the graduated segment, a second pair of disks mounted to turn independent one of the other on the said arm, cylindrical power-lenses set in a circle on the said second pair of disks, one pair of registering cylindrical power-lenses being at the time in axial alinement with the corresponding eyepiece and the said pivot, and a right and left hand screw screwing in the said supports, for moving the same simultaneously toward and from each other, as set forth.

15. An optometer comprising a frame, supports movable toward and from each other on the said frame, and a pair of disks on each support, mounted to turn independent one of the other, one of the disks having plus unit power-lenses from plus 1 D to plus 10 D, minus fraction power-lenses, and a minus 10 D lens, and the other disk having minus unit power-lenses from minus 1 D to minus 10 D, plus fraction power-lenses, and a plus 10 D lens, whereby the instrument may be set to obtain all the spherical powers to 20 D both plus and minus, as set forth.

16. An optometer having a pair of disks one in front of the other and mounted to turn independent one of the other, and cylindrical power-lenses arranged in coinciding circles in the disks, one of the disks having plus unit power-lenses from plus 1 D to plus 5 D and minus fraction power-lenses from minus .25 D to minus .75 D, and the other disk having minus unit power-lenses from minus 1 D to minus 5 D and plus fraction power-lenses from plus .25 D to plus .75 D, as set forth.

17. An optometer provided with supports, arms mounted to swing on said supports, a pair of disks mounted to turn on the same axis, but independent one of the other, on each of said arms, cylindrical power-lenses set in a circle in the said pair of disks, to allow of bringing any one lens in one disk in register with any one of the lenses in the other disk, graduated segments fixed on the supports and having hollow pivots for the arms to swing on, and pointers on the arms indicating on the graduation of the said segments, as set forth.

18. An optometer comprising a frame, supports movable toward and from each other on the said frame, a pair of disks mounted to turn independent one of the other on the same axis, on each of the said supports, spherical power-lenses in each disk arranged in a circle, the lenses in one disk being adapted to register with the lenses in the other disk, the lenses of one of said disks comprising plus unit power-lenses from plus 1 D to plus 10 D, minus fraction power-lenses from minus .12 D to minus .75 D and a minus 10 D lens the lenses of the other disk comprising minus unit power-lenses from minus 1 D to minus 10 D, plus fraction power-lenses from plus .12 D to plus .75 D; and a plus 10 D lens, a second pair of disks mounted to turn independent one of the other, and cylindrical power-lenses set in a circle in the said second pair of disks and adapted to be brought into register with each other and with the spherical power-lenses, the said cylindrical power-lenses giving the cylindrical power from .25 D to 5.75 D both plus and minus, as set forth.

19. In an optometer, a frame, lens-supports having guide-lugs engaging the top and bottom of the frame, the said lens-supports being slidable toward and from each other, nuts carried by said lens-supports, and a right and left hand screw extending between the lens-supports and engaging said nuts, the lower guide-lugs on said lens-supports forming pointers indicating on graduations arranged on the bottom portion of the frame to indicate the pupilary distance, as set forth.

20. In an optometer, a frame having top and bottom members, a support for the said frame, lens-supports having guide-lugs engaging the top and bottom members of said frame, the said lens-supports being slidable toward and from each other, nuts carried by said lens-supports, and a right and left hand screw engaging said nuts and provided at its middle portion, between the lens-supports, with a head for turning the said screw, the bottom member of the frame being provided with graduations, and the lower guide-lugs of the lens-supports forming pointers indicating on the said graduations, as set forth.

21. In an optometer, a supporting-standard, a rod adjustable vertically in said standard and having a transverse socket at its upper end, a frame having an arm secured in one end of the said socket, a bar secured in the other end of the socket, a slide mounted to move on said bar and adapted to carry a reading-card, and lens-supports carried by the frame, as set forth.

22. An optometer comprising a support, a rod adjustable vertically in said support, a frame having an arm secured to the upper end of said rod, an adjustable nose-piece carried by the arm, a bar also secured to the upper end of said rod, and carrying an adjustable reading-card, and lens-supports carried by the said frame, as set forth.

23. An optometer comprising a frame, supports movable toward and from each other on the said frame and a pair of disks on each support mounted to turn independent one of the other, one of the disks having plus unit power-lenses from plus 1 D to plus 10 D, minus fraction power-lenses from minus .12 D to minus .75 D, and a minus 10 D lens, and the other disk having minus unit power-lenses from minus 1 D to minus 10 D, plus fraction power-lenses from plus .12 D to plus .75 D, and a plus 10 D lens, for the purpose set forth.

24. An optometer provided with supports, arms mounted to swing on said supports a pair of disks mounted to turn on the same axes but independent one of the other, on each of said arms, and cylindrical power-lenses arranged in coinciding circles in the disks, said lenses giving the cylindrical powers from .25 D to 5.75 D both plus and minus, as set forth.

In testimony whereof I have signed my name to this specification in the presence of two subscribing witnesses.

WILLIAM J. LAUGHLIN.

Witnesses:
JOHN PAPE,
JAS. F. TAYLOR.